United States Patent [19]
Saad

[11] Patent Number: 5,396,655
[45] Date of Patent: Mar. 7, 1995

[54] ADAPTIVE CANCELER FOR CONTIGUOUS BAND FILTERING

[75] Inventor: Abraham Saad, Whippany, N.J.

[73] Assignee: AT&T Corp., Murray Hill, N.J.

[21] Appl. No.: 983,141

[22] Filed: Nov. 30, 1992

[51] Int. Cl.⁶ ............................................. H04B 1/10
[52] U.S. Cl. .................................. 455/295; 455/306; 455/307; 455/308
[58] Field of Search ............... 455/303, 302, 304, 305, 455/306, 307, 308, 295, 296, 310, 63

[56] References Cited

U.S. PATENT DOCUMENTS

| | | | |
|---|---|---|---|
| 3,916,320 | 10/1975 | Roll et al. | 455/304 |
| 4,211,979 | 7/1980 | Muraoka et al. | 455/306 |
| 4,283,795 | 8/1991 | Steinberger | 455/303 X |
| 4,989,262 | 1/1991 | Saito | 455/138 |
| 5,241,320 | 8/1993 | Mizoguchi | 455/295 |

FOREIGN PATENT DOCUMENTS 0505867 3/1992 European Pat. Off.
2166326 10/1984 United Kingdom ............... 455/305

Primary Examiner—Reinhard J. Eisenzopf
Assistant Examiner—Philip J. Sobutka
Attorney, Agent, or Firm—Robert B. Levy

[57] ABSTRACT

An unwanted portion of a radio frequency signal spectrum appearing on a signal line (12) is adaptively canceled by first sampling the unwanted portion of the spectrum, and thereafter filtering the sample, typically at an intermediate frequency, to reduce signal losses. The first sample is then processed to yield a cancellation signal, having a variable phase. The cancellation signal is then injected into the signal spectrum after which time, the spectrum is again sampled. The second sample is correlated with the cancellation signal and the resultant correlation is employed to adjust the phase of the cancellation signal to maximize the cancellation of the unwanted portion of the spectrum.

7 Claims, 1 Drawing Sheet

ADAPTIVE CANCELER FOR CONTIGUOUS BAND FILTERING

TECHNICAL FIELD

This invention relates to a method and apparatus for canceling an unwanted portion of a very high frequency signal spectrum to effectively filter the spectrum.

BACKGROUND OF THE INVENTION

When radio frequency signals, especially those transmitted at very high frequencies (i.e., above 800 MHz), are received at a radio receiver, the signals are often accompanied by electrical noise and interfering signals. The traditional approach to eliminating such interference within the radio receiver is to place one or more high-Q filter elements in the path of the received signal. For very high frequency receivers, successful filtering of the interference is difficult. Often, the spectral spread, that is, the difference between the desired signal frequency and that of the interference, is very narrow so that the required skirt selectivity of the filter elements must be very sharp. Unfortunately, the higher the skirt selectivity of such filters, the greater their in-line losses, thus degrading the receiver sensitivity.

One possible approach to solving the problem of eliminating the interference is to employ adaptive canceling whereby a cancellation signal, 180 degrees out of phase with the interference signal, is injected into the signal spectra to cancel the interference. The effectiveness of this technique depends on the degree to which the cancellation signal is completely out of phase with the interference.

SUMMARY OF THE INVENTION

Briefly, in accordance with a preferred embodiment of the invention, a method is provided for substantially canceling an unwanted portion of a signal spectrum. The method is initiated by first sampling the spectrum, typically by down-converting the spectrum to obtain an Intermediate Frequency (IF) sample. Thereafter, this first sample is filtered. The filtered first sample is then processed to generate a cancellation signal having an amplitude the same as the signal spectrum but a phase which is different therefrom. The cancellation signal is then injected back into the signal spectrum. The signal spectrum is again sampled to obtain a second sample containing whatever part of the unwanted signal spectrum remains following injection of the cancellation signal into the signal spectrum. The second sample is correlated with the cancellation signal and the phase of the cancellation signal is adjusted in accordance with such correlation until the unwanted portion of the signal spectrum is substantially canceled.

DETAILED DESCRIPTION

Figure 1:
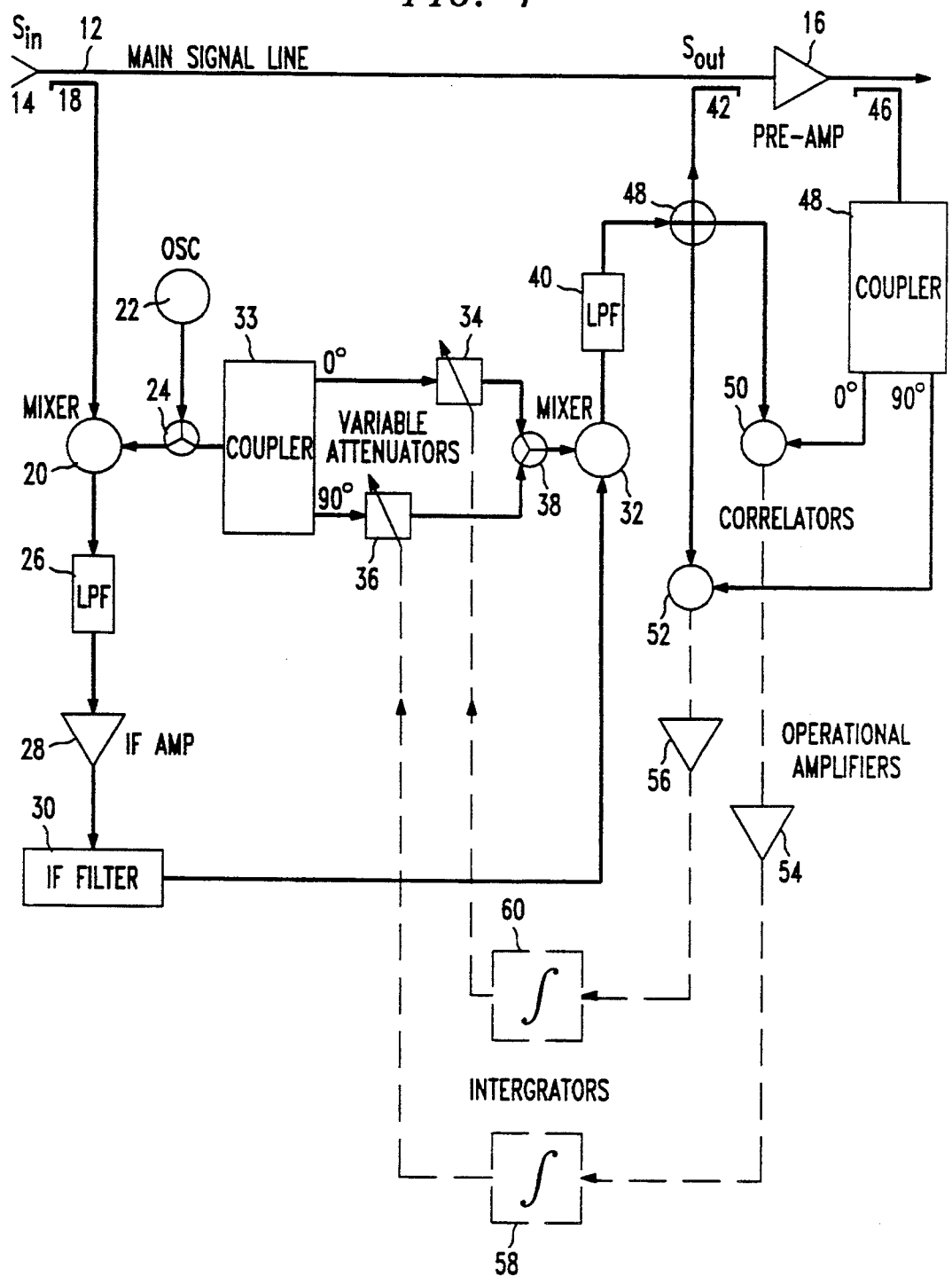
FIG. 1 is a block schematic diagram of a circuit, in accordance with the invention, for adaptively canceling an unwanted portion of a signal spectrum.

FIG. 1 shows a circuit 10, in accordance with the invention, for adaptively canceling an unwanted portion of a signal spectrum present on a signal line 12 running between an antenna 14 and a pre-amplifier 16 within a very high frequency receiver (not shown). In the preferred embodiment, the frequency spectrum of interest lies in the range of 800–900 MHz, although it should be understood that the canceling technique of the invention is applicable to other frequency bands. The canceling circuit 10 comprises a first directional coupler 18, loosely coupled to the main signal line 12, for sampling the unwanted portion of the signal spectrum present on the line. The output signal of the coupler 18 is hereinafter defined as the "first sample."

Once obtained, the first sample is down-converted to avoid adding unnecessary noise during a subsequent filtering operation described below. To carry out such out-of-band filtering, the first sample is mixed at a mixer 20 with a signal supplied from an oscillator 22, through a splitter 24, to effectively convert the first sample to an Intermediate Frequency (IF). Typically the oscillator 22 generates a low power radio frequency signal in the 800–900 MHz range. For a different frequency spectrum, the oscillator 22 frequency would likewise be different. The output signal of the mixer 20, representing the "down-converted" first sample, is then low-pass filtered by a low-pass filter 26 before being amplified by an IF amplifier 28. The output signal of the IF amplifier 28 is filtered by an IF filter 30 to enhance the unwanted portion of the spectrum. In addition to avoiding unnecessary noise and signal losses, down-converting the first sample to an intermediate frequency for the purpose of filtering also affords the advantage that the filters 26 and 30 can be made less costly than those required for filtering at RF.

The down-converted first sample, appearing at the output of the IF filter 30, is mixed at a second mixer 32 with a sample of the oscillator 22 signal to yield a cancellation signal whose phase is different from that of the first sample. To generate this cancellation signal, the oscillator 22 output signal (as split by the splitter 24) is supplied to a coupler 33, typically a 3 dB coupler, that generates a pair of signals which are 0° and 90° out of phase, respectively, with the oscillator 22 output signal. The 0° and 90° out-of-phase signals are attenuated by a separate one of a pair of variable attenuators 34 and 36, respectively. A third mixer 38 mixes the 0° and 90° out-of-phase signals, as attenuated by the attenuators 24 and 36, respectively, to yield a combination of these two signals supplied to the mixer 32. As should be appreciated, by separately adjusting the variable attenuators 34 and 36, the magnitude of the 0° and 90° out-of-phase signals, respectively, can be adjusted, thereby effectively controlling the phase and amplitude of the signal produced at the output of the mixer 38.

The output signal of the mixer 32, representing the cancellation signal, is filtered by a second low pass filter 40 before being injected into the main signal line 12 through a directional coupler 42. As may be appreciated, to the extent that the cancellation signal is phase-inverted with respect to the unwanted portion of the signal spectrum, the unwanted portion of the signal spectrum will be canceled. The amount or degree of such cancellation depends on the phase inversion between the two signals and their equal magnitudes. The better the phase inversion, the greater the degree of cancellation that will occur. The maximum degree of cancellation will occur when the unwanted portion of the spectrum and the cancellation signal are 180° out of phase but are of equal magnitude.

In accordance with the invention, the phase of the cancellation signal is automatically and adaptively varied to maximize the extent of cancellation of the unwanted portion of the signal spectrum. To facilitate automatic adjustment of the phase of the cancellation signal to maximize the extent of cancellation, the cancellation circuit 10 of FIG. 1 includes a third directional coupler 46, loosely coupled to the output of the preamplifier 16. The coupler 46 provides a second sample of the unwanted portion of the signal spectrum. The second sample obtained from the directional coupler 46 is input to coupler 48 which produces a pair of signals.

Each of a pair of correlators 50 and 52 correlates a separate one of the signals produced by the coupler 48 with the cancellation signal from the mixer 32. The output signal of each of the correlators 50 and 52 is amplified by a separate one of a pair of operational amplifiers 54 and 56 and is then integrated by a separate one of a pair of integrators 58 and 60. Each of the integrators 58 and 60 produces an output signal which controls a separate one of the variable attenuators 34 and 36, respectively.

Controlling each of the variable attenuators 34 and 36 in accordance with the correlation between a separate one of the two components of the second sample and the cancellation signal serves to maximize the extent of cancellation of the unwanted portion of the signal spectrum. This may be understood as follows. When the cancellation signal is injected into the signal line 12, the cancellation signal, which is out of phase with the signal on the signal line 12, and hence the unwanted portion of the signal spectrum, thus cancels part or all of the unwanted portion of the signal spectrum. The extent of the cancellation depends on the degree of phase-inversion.

When the second sample, which might contain the unwanted portion of the spectrum, is correlated with the cancellation signal, the degree of correlation between them varies inversely with the degree to which the cancellation signal cancels the unwanted portion of the signal spectrum. If the extent of the cancellation is great, then the resultant correlation will be low and vice versa. By controlling each of the attenuators 34 and 36 in accordance with the correlation between a separate one of the two components of second sample and the cancellation signal, the degree of cancellation of the unwanted portion of the signal spectrum is thus adaptively maximized.

Each line within the path between the directional coupler 18 and the directional coupler 42 is represented in the figure by a solid line, whereas each line within the path between the directional coupler 46 and the variable attenuators 34 and 36 is represented by a dashed line. The former set of lines carries signals and has much more stringent shielding requirements, whereas the latter set of lines carries control information and is more tolerant of interference.

The foregoing describes a circuit 10 for adaptively canceling an unwanted portion of a signal spectrum.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A method for substantially canceling an unwanted portion of a signal spectrum comprising the steps of:
   sampling the signal spectrum to obtain a first sample containing the unwanted portion of the spectrum;
   filtering the first sample;
   processing the first sample after filtering to generate a cancellation signal having the same amplitude but a phase different from the signal spectrum wherein the first sample is processed by the steps of:
   generating an oscillator output signal;
   passing the oscillator output signal through a coupler to obtain first and second signals that are 0° and 90° out of phase, respectively, with the oscillator output signal;
   mixing the first and second signals together; and
   mixing the mixed first and second signals with the first sample;
   injecting the cancellation signal into the signal spectrum;
   sampling the signal spectrum after injection of the cancellation signal into the spectrum to obtain a second sample;
   correlating the second sample with the cancellation signal; and
   adjusting the phase and amplitude of the cancellation signal in accordance with the correlation between the second sample and the cancellation signal until the unwanted portion of the signal spectrum is substantially canceled.

2. The method according to claim 1 wherein the phase of the cancellation signal is adjusted by attenuating at least one of the first and second signals.

3. The method according to claim 1 wherein the filtering step comprises:
   down-converting the first sample to an intermediate frequency;
   passing the down-converted first sample through a low-pass filter;
   amplifying the low-pass-filtered, down-convened first sample; and
   filtering the amplified, low-pass-filtered, down-convened first sample with an intermediate frequency filter;

4. The method according to claim 1 wherein the correlating step includes the steps of:
   splitting the second sample into first and second portions; and
   separately correlating each of the first and second portions of the second sample with the cancellation signal.

5. Apparatus for adaptively canceling an unwanted portion of a signal spectrum appearing on a signal line, comprising:
   means coupled to the signal line for obtaining a first sample of the unwanted portion of the signal spectrum;
   means for filtering the first sample;
   means for processing the first sample to generate a cancellation signal having the same amplitude but a phase different from the signal spectrum wherein the means for processing the filtered first sample comprises:
   oscillator means for generating a radio frequency signal;
   a coupler for separating the oscillator means output signal into a pair of signals that are 0° and 90° out of phase, respectively, with the oscillator means output signal;
   a first mixer for mixing the 0° and 90° out-of-phase signals together;
   a second mixer for mixing the output signal of the first mixer with the first sample;
   means for injecting the cancellation signal into the signal line;

means for obtaining a second sample of the unwanted portion of the
signal spectrum following injection of the cancellation signal into the signal line;
means for correlating the second sample with the cancellation signal; and
means responsive to the correlating means for adjusting the phase of the cancellation signal so that the correlation between the second sample and the cancellation signal is minimized.

6. The apparatus according to claim 5 wherein the means for adjusting the phase of the cancellation signal comprises:
   a first variable attenuator for attenuating the 0° out-of-phase signal; and
   a second variable attenuator for attenuating the 90° out-of-phase signal.

7. The method according to claim 5 wherein the means for filtering the first sample comprises:
   means for down-convening the first sample to an intermediate frequency;
   a low-pass filter for low-pass filtering the down-converted first sample;
   an intermediate frequency amplifier for amplifying the down-converted, low-pass-filtered first sample; and
   an intermediate frequency amplifier for amplifying the first sample filtered by the intermediate frequency filter.

* * * * *